E. T. WELCOME.
SEWAGE DISPOSAL SYSTEM.
APPLICATION FILED JULY 16, 1909.
980,463.
Patented Jan. 3, 1911.
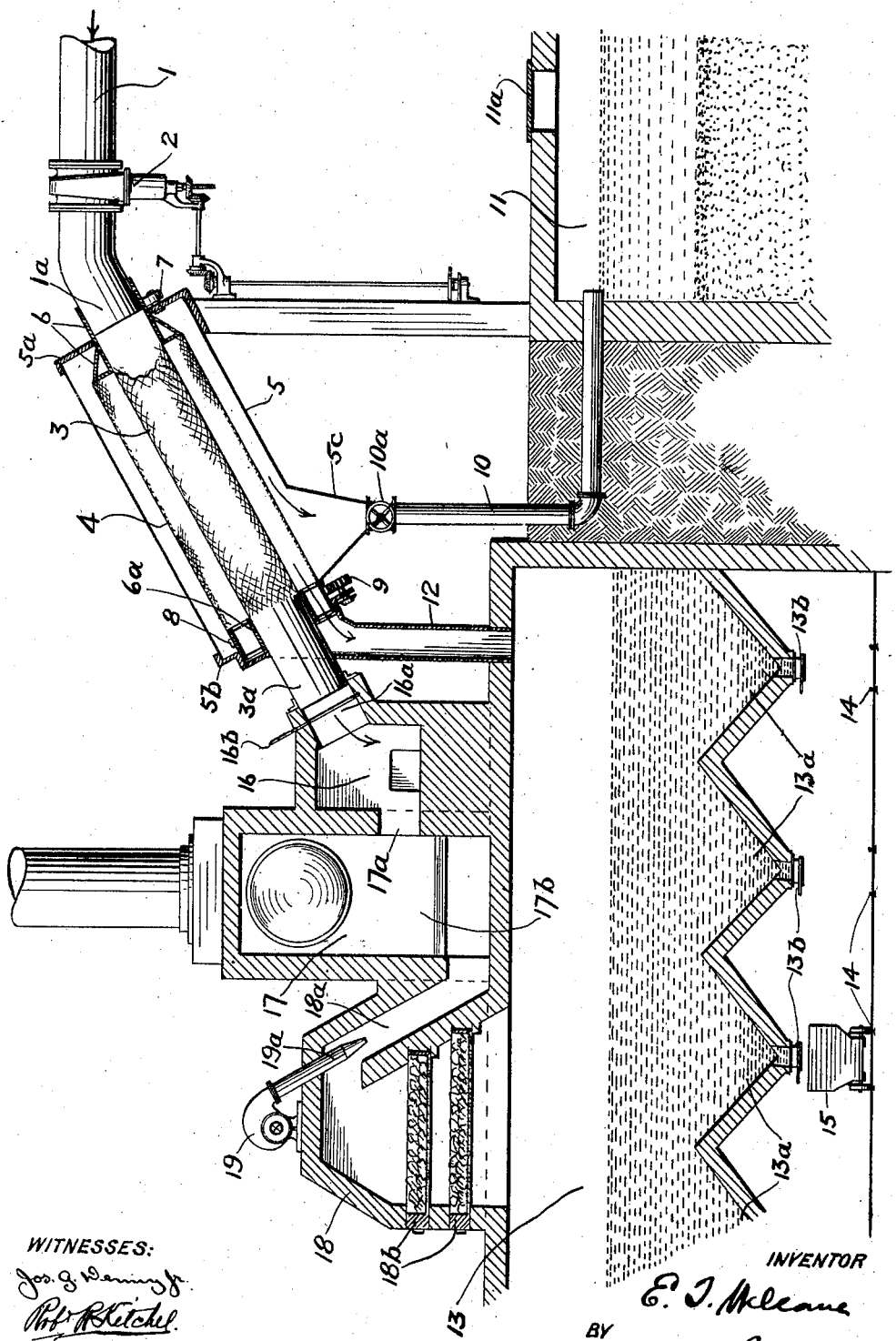
WITNESSES:
INVENTOR
BY
ATTORNEY.

UNITED STATES PATENT OFFICE.

EARNEST T. WELCOME, OF NEW YORK, N. Y.

SEWAGE-DISPOSAL SYSTEM.

980,463.  Specification of Letters Patent.  Patented Jan. 3, 1911.

Application filed July 16, 1909. Serial No. 507,936.

*To all whom it may concern:*

Be it known that I, EARNEST T. WELCOME, a citizen of the United States, residing in the city of New York, county of New York, and State of New York, have invented an Improved Sewage-Disposal System, of which the following is a specification.

This invention is a sewage disposal system wherein the liquid, semi-solid and solid foreign matter in the sewage are separated, the liquid passed to a filter, the semi-solid matter passed to a storage reservoir having a furnace connected therewith, the solid foreign matter passed to a receiving chamber connected with the furnace, and the gases recovered or burned.

The leading objects are the recovery of the constituents of sewage valuable in the arts, primarily as fertilizers, the purification of contaminated water and the destruction of offensive odors.

The accompanying drawing shows a sectional elevation of apparatus embodying my invention.

The invention, as shown in the drawing, comprises the flume 1, controlled by a valve 2, and discharging into a revoluble coarse screen 3 inclosed by and fixed to a revoluble fine screen 4 disposed within a stationary casing 5. The upper ends of the screens 3 and 4 are connected by a collar 6 which revolves on rollers 7, the collar revolving around the outlet end 1$^a$ of the flume 1 and within the closed upper end 5$^a$ of the casing 5. The lower ends of the screens 3 and 4 are connected together by a spider 6$^a$ which revolves within the closed lower end 5$^b$ of the casing 5 and has thereon the circular rack 8 engaged by the driving gear 9, by means of which the screens are revolved.

The casing 5 discharges, by way of a hopper or funnel 5$^c$ in the bottom thereof, into a conduit 10, controlled by a valve 10$^a$, which discharges into a filter 11 accessible in any suitable maner, as by a manhole 11$^a$.

The interior of the screen 4 discharges through its open lower end into the conduit 12 and thence into a reservoir 13, the latter having the bottom hoppers 13$^a$, controlled by valves 13$^b$, placed above the tracks 14 by which cars 15 are passed under the hoppers and loaded with the contents of the reservoir.

The screen 3 has the extension 3$^a$ thereon which discharges into a receiving chamber 16 having the neck 16$^a$ in which the part 3$^a$ revolves, a valve 16$^b$ controlling the discharge from the screen 3 to the chamber 16.

A furnace 17 has a door or passage 17$^a$ connecting its primary combustion chamber 17$^b$ with the chamber 16 so that refuse matter collected and dried in this chamber can be passed into the combustion chamber and consumed.

A cupola or stack 18, above the reservoir 13, communicates, by the passage 18$^a$, with the furnace combustion chamber, and in the passage through the cupola or stack are placed removable trays 18$^b$ loaded with chlorid of lime or other suitable material for absorbing gases given off by the matter contained in the reservoir. A blower 19, having a nozzle 19$^a$, forces a stream of air through the passage 18$^a$ to draw off the gases from the reservoir through the absorbent material and carry the unabsorbed gases into the furnace.

It will be understood that, in operation, the sewage, discharged by the flume 1 into the revolving coarse screen 3, is separated thereby: the solid foreign matter, such as large pieces of paper, sticks and the like, passes through the extension 3$^a$ into the chamber 16, while the liquid and semi-solid matter passes through the coarse meshes of the screen, upon the interior of the cylindrical body of the finer mesh screen 4. The screen 4 passes the liquid through its meshes into the casing 5, whence it flows by the conduit 10 into the filter 11, and the semi-solid matter is delivered through the open lower end of the screen 4, whence it flows by the conduit 12 into the reservoir 13. The liquid, which is passed through the filter 11, is so cleansed thereby that it can be turned into streams without contaminating the waters thereof, while the filter collects, particularly upon the upper strata thereof, matter having valuable fertilizing properties, which can be removed periodically. The semi-solid matter (chiefly excrement) which is collected in the reservoir 13, is carried away therefrom, by cars 15, to be treated as provided in my Patent No. 889,418, or otherwise. The material used in the trays, for absorbing the chemical constituents of the gases passed off from the reservoir, can be changed from time to time, the saturated material being used either as a fertilizer directly or its constituents may be driven off and collected. Gases passing through the trays and the solid matter dried in the chamber 16 are consumed in the furnace.

Having described my invention, I claim:

1. In a sewage disposal system, the combination of a conduit, a filter, a reservoir, mechanism comprising a plurality of screens in said conduit for separating matter delivered by said conduit, means for carrying liquid separated by said mechanism to said filter, and means for carrying a constituent of said matter to said reservoir.

2. In a sewage disposal system, the combination of a conduit, a revoluble separator in said conduit, a reservoir connected with said conduit, means for collecting and consuming gases discharged from said reservoir, and means for discharging through the bottom of said reservoir matter contained therein.

3. In a sewage disposal system, the combination of a reservoir, a drying chamber, a conduit having parts leading respectively to said reservoir and drying chamber, a conduit leading from said reservoir, means in said conduit last named for absorbing gases discharged from said reservoir, and a furnace having a combustion chamber connected with said reservoir and drying chamber.

4. In a sewage disposal system, the combination of a reservoir, a furnace, a conduit, mechanism in said conduit for separating matter delivered thereby, means for conveying a separated constituent of said matter to said reservoir, and means for conveying a separated constituent of said matter to said furnace.

5. In a sewage disposal system, the combination of a conduit, a filter, a reservoir, a furnace, mechanism for separating matter delivered by said conduit, means for conveying liquid separated by said mechanism to said filter, means for conveying semi-solid matter from said mechanism to said reservoir, and means for conveying solid foreign matter from said mechanism to said furnace.

6. In a sewage disposal system, the combination of a screen, a filter, a reservoir, a furnace, means for passing liquid from said screen to said filter, means for passing matter from said screen to said reservoir, and means for passing matter from said screen to said furnace.

7. In a sewage disposal system, the combination of a screen, a reservoir, a furnace, means for passing matter from said screen to said reservoir and means for passing matter from said screen to said furnace.

8. In a sewage disposal system, the combination of a separating mechanism, a filter, means for conveying matter from said mechanism to said filter, a reservoir, means for conveying matter from said mechanism to said reservoir, a furnace, and means for conveying gases from said reservoir to said furnace.

In witness whereof I have hereunto set my name this 14th day of July A. D. 1909, in the presence of the subscribing witnesses.

EARNEST T. WELCOME.

Witnesses:
JOHN WILLIAM SMITH,
L. T. REED.